US006996080B1

(12) United States Patent  
Orr (10) Patent No.: US 6,996,080 B1
(45) Date of Patent: Feb. 7, 2006

(54) CHIP-SYNCHRONOUS CDMA MULTIPLEXER AND METHOD RESULTING IN CONSTANT ENVELOPE SIGNALS

(75) Inventor: Richard S. Orr, Montgomery Village, MD (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 813 days.

(21) Appl. No.: 09/618,102

(22) Filed: Jul. 17, 2000

Related U.S. Application Data

(60) Provisional application No. 60/145,094, filed on Jul. 23, 1999.

(51) Int. Cl.  
H04B 7/216 (2006.01)

(52) U.S. Cl. ...................... 370/335; 370/342; 455/126; 375/346

(58) Field of Classification Search ........ 370/206–210, 370/335, 342, 276–281; 455/78, 83–88, 455/126, 295, 304, 309, 296; 375/344–346  
See application file for complete search history.

(56) References Cited

U.S. PATENT DOCUMENTS

| | | | | |
|---|---|---|---|---|
| 5,848,105 | A * | 12/1998 | Gardner et al. ............. | 375/336 |
| 5,903,555 | A * | 5/1999 | Wildauer et al. ........... | 370/342 |
| 5,956,332 | A | 9/1999 | Rasanen et al. ............ | 370/342 |
| 6,009,090 | A | 12/1999 | Oishi et al. | |
| 6,026,129 | A * | 2/2000 | Ohta et al. .................. | 375/332 |
| 6,064,663 | A * | 5/2000 | Honkasalo et al. ......... | 370/335 |
| 6,078,576 | A | 6/2000 | Schilling et al. ............ | 370/347 |
| 6,091,759 | A | 7/2000 | Rotstein et al. ............. | 375/134 |
| 6,108,317 | A * | 8/2000 | Jones et al. .................. | 370/320 |
| 6,205,167 | B1 * | 3/2001 | Kamgar et al. ............. | 375/134 |
| 6,240,081 | B1 * | 5/2001 | Khalona ..................... | 370/342 |
| 6,266,320 | B1 * | 7/2001 | Hedberg et al. ............ | 370/206 |
| 6,298,099 | B1 * | 10/2001 | Resnikoff et al. ........... | 375/322 |
| 6,349,216 | B1 * | 2/2002 | Alberth et al. ........... | 455/550.1 |
| 6,366,619 | B1 * | 4/2002 | McCallister et al. ........ | 375/295 |
| 6,373,902 | B1 * | 4/2002 | Park et al. .................. | 375/296 |
| 6,393,047 | B1 * | 5/2002 | Popovic' .................... | 375/140 |
| 6,396,826 | B1 * | 5/2002 | Ohlson et al. .............. | 370/342 |
| 6,404,823 | B1 * | 6/2002 | Grange et al. .............. | 375/297 |
| 6,445,749 | B2 * | 9/2002 | Feher ......................... | 375/298 |
| 6,449,303 | B2 * | 9/2002 | Hunton ....................... | 375/130 |
| 6,459,723 | B1 * | 10/2002 | Kim et al. ................... | 375/146 |
| 6,466,566 | B1 * | 10/2002 | De Gaudenzi et al. ..... | 370/342 |
| 6,493,330 | B1 * | 12/2002 | Miya et al. ................. | 370/335 |
| 6,493,334 | B1 * | 12/2002 | Krzymien et al. .......... | 370/342 |
| 6,501,955 | B1 * | 12/2002 | Durrant et al. .......... | 455/456.1 |

(Continued)

OTHER PUBLICATIONS

Spilker et al, "Code Multiplexing via Majority Logic for GPS Modernization", pp. 265-273, Sep. 15, 1998.*

(Continued)

*Primary Examiner*—Zarni Maung  
*Assistant Examiner*—Van Nguyen  
(74) *Attorney, Agent, or Firm*—Edell, Shapiro & Finnan, LLC (57) ABSTRACT

A multiplexer and a method for chip-synchronous code-division multiple access (CDMA) signals produces a constant envelope signal. The output signal of the multiplexer permits use of a saturating (Class C) high power amplifier (HPA) resulting in a net increase in effective transmitter power usage. This multiplexer applies to a variety of CDMA spread spectrum modulation formats and has many applications, such as the IS-95 forward link interface, and CDMA and CDMA/FDMA (frequency-division multiple access) applications, including general cellular base station forward traffic channels, cellular subscriber station multiple-channel reverse traffic channels (e.g. IS-95 subscriber Internet access) and satellite downlinks.

37 Claims, 6 Drawing Sheets

U.S. PATENT DOCUMENTS

| | | | |
|---|---|---|---|
| 6,504,883 B1 * | 1/2003 | Morimoto et al. | 375/343 |
| 6,512,417 B2 * | 1/2003 | Booth et al. | 330/149 |
| 6,515,961 B1 * | 2/2003 | Weaver et al. | 370/206 |
| 6,516,183 B1 * | 2/2003 | Hellmark | 455/78 |
| 6,553,080 B2 * | 4/2003 | Resnikoff et al. | 375/271 |
| 6,556,814 B1 * | 4/2003 | Klomsdorf et al. | 455/121 |
| 6,587,511 B2 * | 7/2003 | Barak et al. | 375/295 |
| 6,594,286 B2 * | 7/2003 | Chen et al. | 370/529 |
| 6,701,163 B1 * | 3/2004 | Hiramatsu | 455/561 |

OTHER PUBLICATIONS

James J. Spilker, Jr. et al., "Code Multiplexing via Majority Logic for GPS Modernization", pp. 265-273.

European Search Report, EP 00 94 8747.

Wada T et al: "A Constant Amplitude Coding for Orthogonal Multi-Code CDMA Systems", Dec. 1, 1997, IEICE Trans Fundamentals, vol. E80-A No. 12 Dec. 1997, pp. 2477-2483.

Butman S et al: "Interplex—An Efficient Multi-Channel PSK/PM Telemetry System" International Conference on Communications Conference Record. ICC, Jun. 1971, pp. 46-5-46-10.

Supplementary European Search Report, Application No. EP 00 94 8747.

* cited by examiner

CHIP-SYNCHRONOUS CDMA MULTIPLEXER AND METHOD RESULTING IN CONSTANT ENVELOPE SIGNALS

REFERENCE TO RELATED APPLICATION

This application is based on provisional application Ser. No. 60/145,094 filed Jul. 23, 1999 entitled CHIP-SYNCHRONOUS CDMA MULTIPLEXER.

TECHNICAL FIELD OF INVENTION

This invention relates to general wired and wireless communication systems, and in particular to code-division multiple access (CDMA) multiplexing and modulation systems.

BACKGROUND

The forward link (base station-to-mobile subscriber) of an IS-95-compatible CDMA cellular telephone system is subject to a variety of quality of service (QoS), range of coverage and traffic capacity limitations stemming from insufficient transmitter power. A 100-W transmitter may yield as little as 8 W at the antenna terminals after line losses and as much as 9 dB power backoff to accommodate peak-to-average power ratio of the non-constant envelope signal. Since there typically is no diversity on a forward link, a stationary or low-velocity mobile in a heavy multipath environment (e.g. urban canyon) can experience long fades not correctable by coding and interleaving, the result of which typically is a dropped call. A second problem is that reverse link capacity is often not employed most beneficially, since a mobile may not have access to the strongest available reverse link.

All proposed solutions to these problems require application of additional transmit power. To preserve the link to a user in a deep, slow fade, both of the following have been suggested: (1) command a substantial power boost on that user's forward link; or (2) employ dual-diversity forward link transmission. Reverse link efficiency can be enhanced by putting the user's forward link into hand-off mode with respect to multiple base stations, thus offering the mobile subscriber a choice of reverse links. The extent to which any of these remedies succeeds is limited by availability of transmit power.

Similar circumstances may result if the transmitter is a satellite or other facility.

The object of the present invention is to provide forward link multiplexing and method to alleviate these limitations. The notion is simply to use the available power more efficiently. Rather than replace the high power amplifier (HPA) to increase the transmitter power, one replaces the multiplexer.

Figure 1:
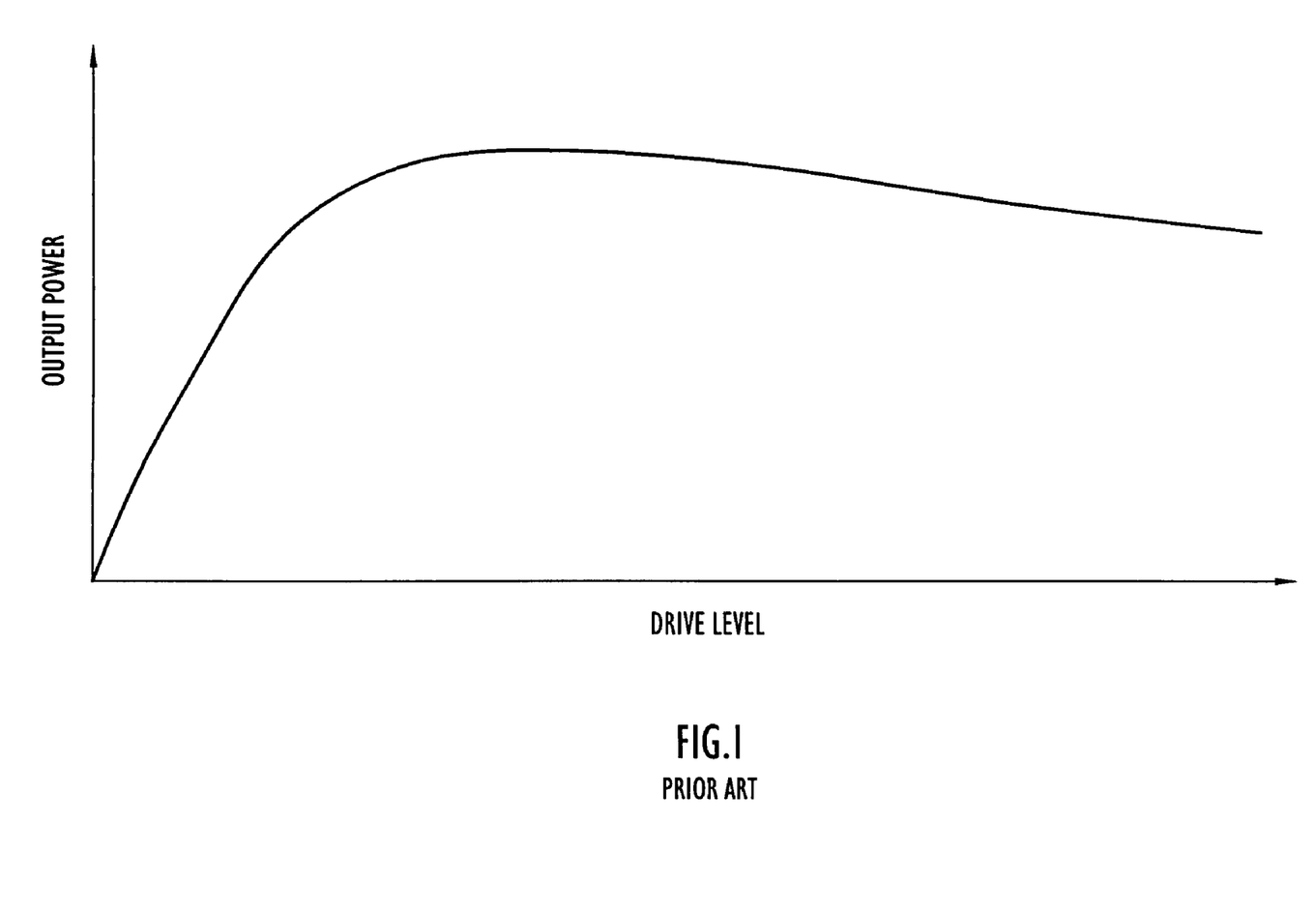
FIG. 1 portrays a typical HPA output characteristic vs. drive level.

Linear superposition of chip-synchronous, orthogonal signals (as in the IS-95 forward link) is a theoretically lossless multiplex if the subsequent transmission chain remains linear. Maintaining linearity requires a linear HPA. Since any HPA characteristic eventually saturates as its input power grows (see FIG. 1), IS-95 base station transceiver linear amplifiers are typically run at 4–5 dB average power backoff to accommodate peak power needs. (Third generation wireless mobile networks, e.g. cdma2000, might serve a greater number of subscribers per base station and require correspondingly greater backoff.) In addition, the rather severe spectral containment filtering applied to each user signal before multiplexing creates amplitude fluctuations of 4–5 dB peak-to-average power, requiring additional backoff. Thus total backoff can easily be 9 or 10 dB.

An alternative approach to producing greater average power is to achieve a more effective allocation of the loss budget between the multiplexer and the HPA. Applied to orthogonal waveforms, non-linear multiplex methods that produce a constant envelope signal will permit a greater fraction of the available transmitter power to be used for communication, but at the expense of a multiplexing loss that may be characterized as either cross-talk (induced non-orthogonality or harmonic distortion) or receiver cross-correlation mismatch. This multiplexing loss, however, is typically smaller than the power backoff it replaces, resulting in a favorable trade.

Figure 2:
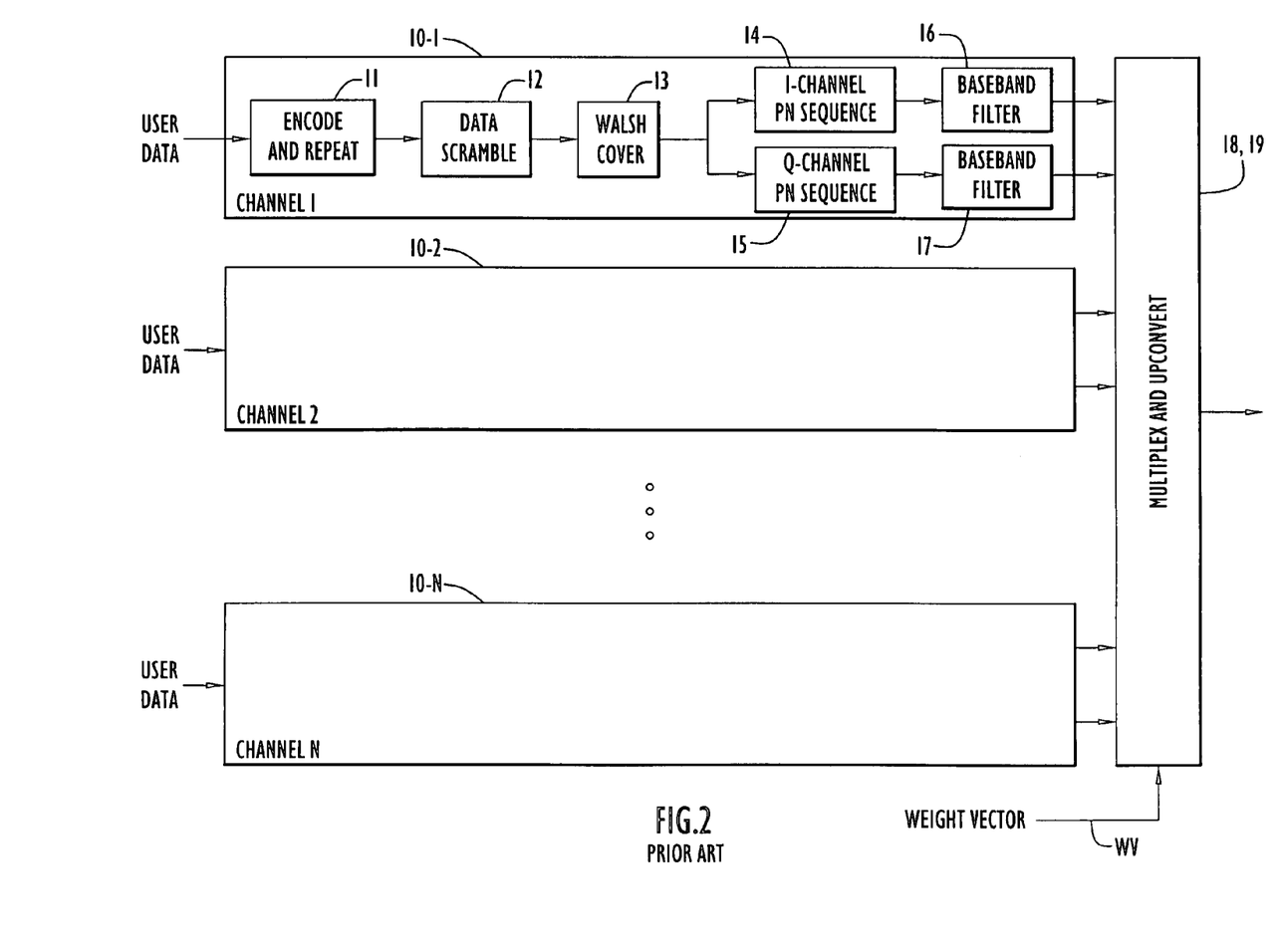
FIG. 2 shows the present IS-95 forward link waveform construction.

The manner in which a CDMA base station processes input user data to create a baseband signal that is a multiplexed composite of multiple CDMA codes is illustrated in FIG. 2. The multiplexing indicated in FIG. 2 is fully additive, or linear. Each user data stream or channel 10-1, 10-2 ... 10-N is rate-½ convolutionally encoded 11 and the encoded symbols are repeated (as a function of data rate) to produce a 19.2 kb/s stream. These symbols are interleaved and then covered (scrambled) 12 with a PN sequence. The resultant is then modulated 13 by a repeating 64-bit Walsh word that identifies the channel; chips of the Walsh word are at the system chip rate of 1.2288 MHz. The signal is then split into two paths for quadrature spread spectrum modulation; after separate I-channel 14 and Q-channel 15 codes (called the pilot channel PN sequences) are applied, both signals are baseband filtered 16, 17 to retain only their central spectral lobe for spectrum control. This step introduces amplitude fluctuations with a peak-to-average power ratio of 4–5 dB. Multiplexing 18 then occurs by weighted linear combination of all user I and Q components, after which the net I and Q channels are coherently upconverted 19 and combined into a QPSK spread waveform. Multplexing introduces another 4–5 dB of peak-to-average power variation.

SUMMARY OF THE INVENTION

The equivalent process employing the multiplexer of this invention is incorporated in the present invention. User data processing is the same through development of I and Q sequences. Both the digital streams and a power weight vector WV are presented to the multiplexer, which outputs I and Q sequences that are then filtered and upconverted to form the QPSK sequence at RF.

It is therefore desirable to provide systems and methods that enable chip-synchronous CDMA signals to be multiplexed into a constant-envelope signal.

In a CDMA communication system and method according to the invention, a centralized location, e.g. a base station or satellite, transmits multiple CDMA signals to a group of spatially dispersed users. These signals employ binary phase-shift keying (BPSK) or quadrature phase-shift keying (QPSK), direct sequence (DS) spread spectrum modulation and have a common chip rate and carrier frequency. The timing of the transmissions being under control of the transmitter, the multiple CDMA signals are chip-synchronous.

For reasons of power control, a power weighting, or fraction of the available transmit power, is periodically assigned to each CDMA signal. This power distribution assignment remains in effect for a period of time equal to a large number of spread spectrum chips. This power distribution is provided to the multiplexer.

During each interval of constant power distribution, the multiplexer receives as input a set of chips to be transmitted for each code. These chips are represented as binary digital data to be assigned to the in-phase (I) and quadrature (Q) transmission channels.

Based on the commanded power distribution, the multiplexer determines, on a chip-by-chip basis, the values of those I and Q chips to be transmitted in a single DS spread spectrum signal representing the multiple input CDMA signals. It does so in a manner that insures that the total instantaneous power, represented by $I^2+Q^2$, remains constant for all chip intervals. It may do so by keeping $I^2$ and $Q^2$ individually constant, or by controlling their sum, depending on the desired nature of the signal to be transmitted. In either case, the said baseband DS spread spectrum signal produced by the multiplexer has constant envelope.

Because the said multiplexer output signal cannot perfectly represent the multiple input signals, the algorithm employed by the multiplexer to produce its output I and Q chips minimizes (or approximately minimizes) the loss in effective power experienced in a receiver of said signal when that receiver correlates the received signal with a time-aligned replica of its assigned CDMA code. The multiplexing loss is the same for each user signal, preventing any one signal from suffering excessive effective power loss at the expense of the others.

The invention employs constant-envelope multiplexing to increase the overall effective power utilization by recouping as much as possible of the HPA backoff necessitated by the linear multiplex. (Spectral containment filtering would as well be applied to the new multiplexer output and represents a non-recoverable loss.) A non-linear multiplex method has been devised that produces a constant envelope signal and accommodates any commanded forward link power distribution with the minimum possible multiplex loss.

The multiplexer exploits the fact that the outgoing CDMA signals are spread-spectrum with identical and synchronized chip rates. (Certain multirate spread spectrum codes may be accommodated as well.) The pre-processing that creates the multiplex operates in the digital baseband domain on a chip-by-chip basis. The multiplexer executes a time-varying mapping from its inputs, the set of concurrent input chips and the commanded power weights, to its output, a single chip value. The resultant chip stream may be directly modulated to RF without intermediate steps of combining power-weighted signals at IF.

The multiplexer exploits majority-vote logic, in which an output binary chip value is selected to be that value taken on by the majority of the input chips (for an assured majority in every case the number of inputs must be odd.) Simple majority vote logic produces a multiplex in which each component is equally weighted. For the fewest possible number of transmitted signals, three, majority vote multiplexing is known to result in a 1.25 dB multiplexing loss. As the number of equal-weighted inputs increases, the loss also increases but never exceeds 1.96 dB.

Power weighting of the multiplexer inputs is accomplished by using a statistical mix of majority vote rules operating on appropriately chosen subsets of the input chips. The power distribution is achieved by judiciously choosing the relative frequency of use of the various majority vote rules. A given power distribution can typically be achieved in more than one way; among these ways, the one achieving the smallest multiplexing loss will be employed for the duration of that power distribution. Majority vote logic may be implemented by taking a weighted summation of chip values and computing its algebraic sign.

BRIEF DESCRIPTION OF THE FIGURES

The above and other objects, advantages and features of the invention will become more apparent when considered with the following specification and accompanying drawings wherein.

DETAILED DESCRIPTION

Figure 3:
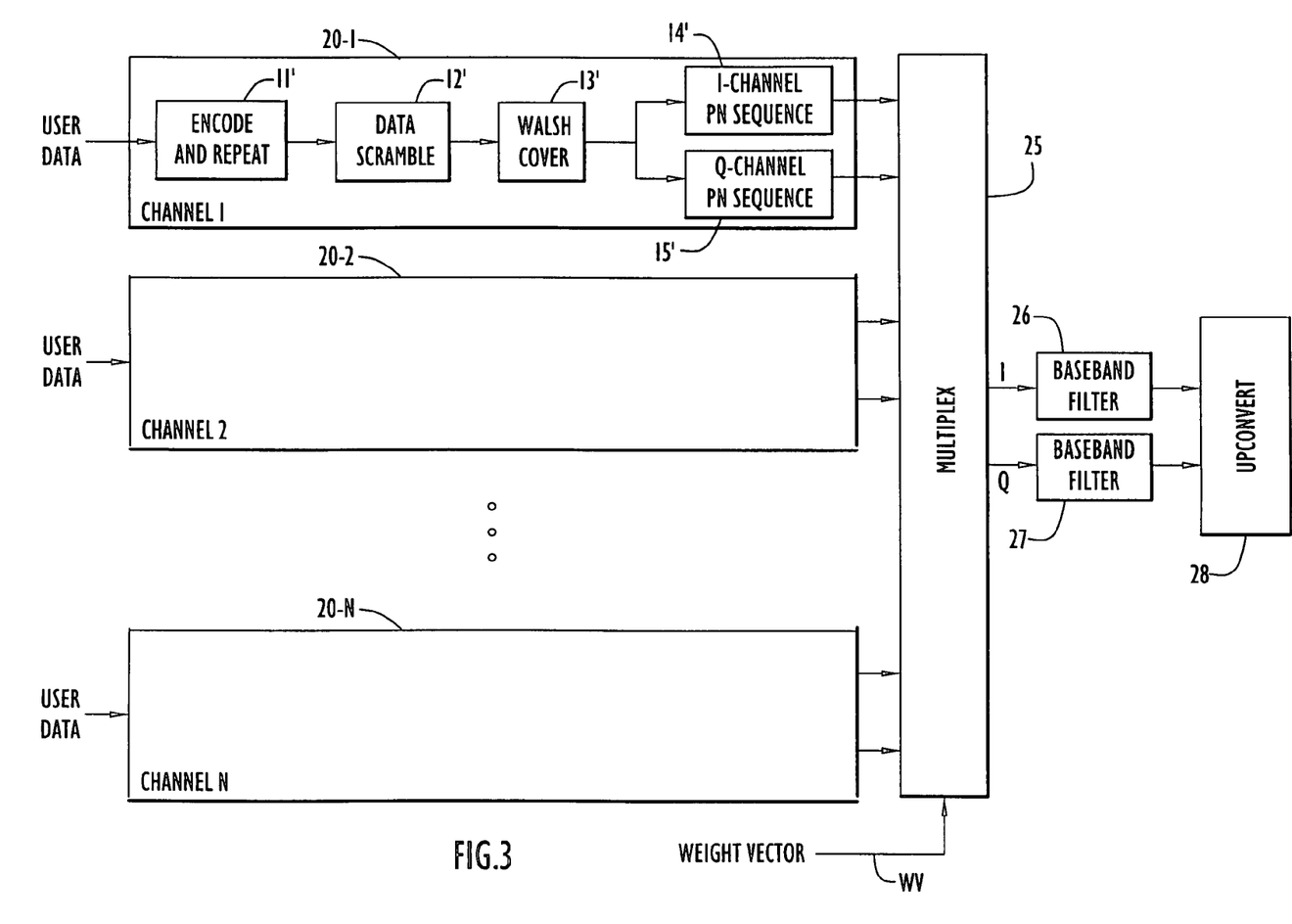
FIG. 3 shows how the IS-95 forward link waveform would be constructed using the invention.

Referring to FIG. 3, user data processing is the same through development of I and Q sequences as in the prior art (FIG. 2), and the same numerals are used with a prime mark. Both the digital streams and a power weight vector WV' are presented to the multiplexer 25, which outputs I and Q sequences that are then bandpass filtered 26, 27 and upconverted 28 to form the QPSK sequence at RF. It is therefore desirable to provide systems and methods that enable chip-synchronous CDMA signals to multiplexed into a constant-envelope signal.

Figure 4:
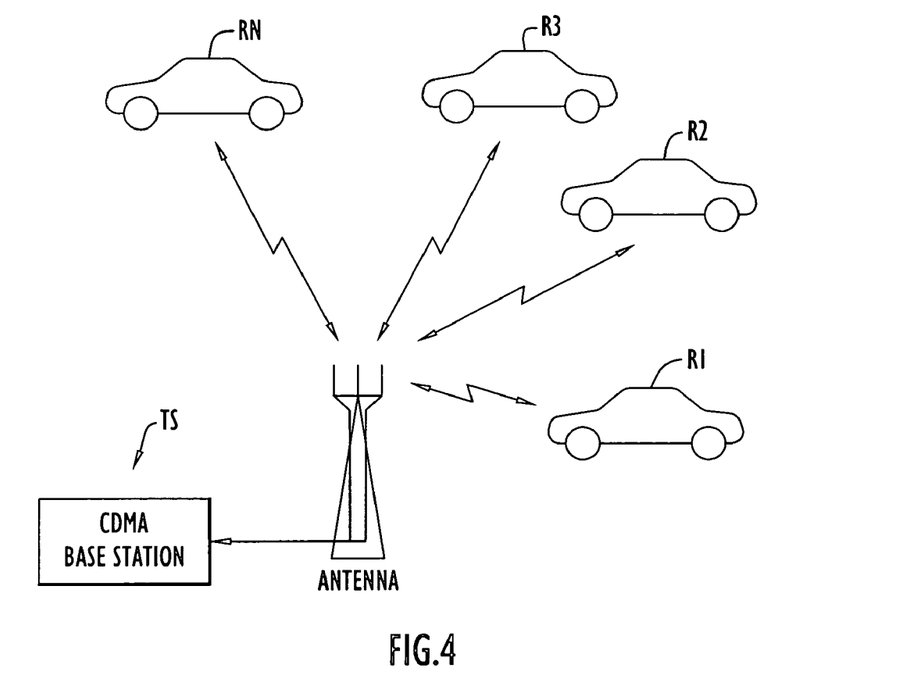
FIG. 4 shows a general CDMA communication system incorporating the principles of the invention.

With reference to FIG. 4, a general CDMA communication system incorporating the principles of the invention includes a transmitting station TS and multiple receivers R1, R2, R3 . . . RN separated by a communication channel, represented in FIG. 4 as a noise source.

According to the invention, the transmitter forms and transmits a constant-envelope, direct sequence (DS) spread spectrum signal having a waveform in which are encoded multiple user signals to be simultaneously transmitted to multiple user receivers. Each input user signal is a DS spread spectrum waveform consisting of a pre-assigned DS sequence unique to that user, upon which data has been impressed using some form of modulation, typically, BPSK or QPSK.

Figure 5:
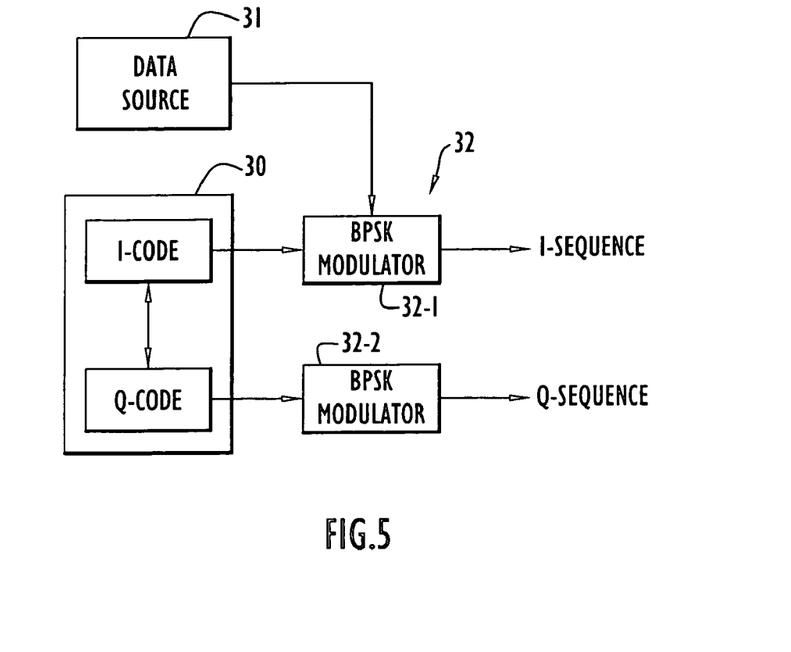
FIG. 5 shows the formation of a single user baseband sequence that results from generating the user-assigned spread spectrum sequence and impressing user data upon it.

The following steps constitute formation of the transmitted signal. Each user's assigned spread spectrum sequence is synthesized by a digital code generator 30. This sequence consists of a digital I stream and a digital Q stream, both of which are binary digits. The Q stream is absent if the spread spectrum modulation is not QPSK. Both the user sequence and the user data stream 31 are presented to modulators 32-1, 32-2 that produces a digital output stream similar in character to the user sequence (FIG. 5).

Figure 6:
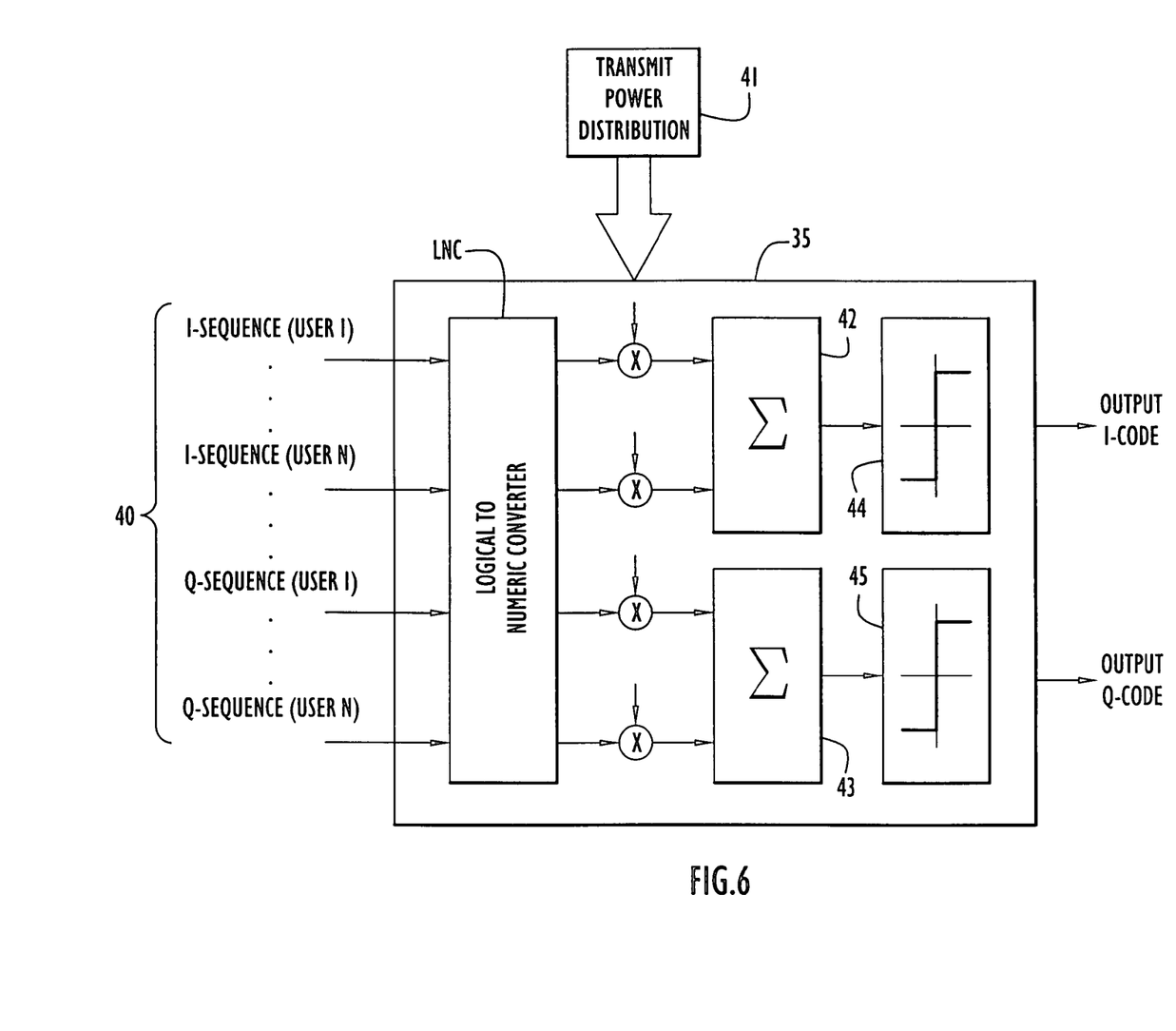
FIG. 6 explains the processing steps performed by the invention.

The set of data-modulated sequences is presented to multiplexer 25 that processes the input (I, Q) sequence pairs into a single (I, Q) sequence pair that has constant envelope in the sense that the quantity $I^2+Q^2$ remains constant on a per-chip basis. The multiplexer 25 does this at successive instants of time separated by a clock period equal to the spread spectrum chip duration. FIG. 6 illustrates and describes the operation of multiplexer 25. Its inputs 40 consist of the set of data-modulated sequences for each active user and a commanded transmit power distribution 41 for the user signals. The multiplexer 25 synchronizes the input sequences and at a given time processes an (I, Q) chip pair from each sequence.

In one embodiment the multiplexer 25 processes the I chips as one group and the Q chips as another. For this purpose the chips are converted in a logical-to-numeric converter LNC from logical ones and zeros to numerical +1s according to the rule: logical 0→+1; logical 1→−1. Multiplicative weighting factors are applied to the chips and the said weighted chips are summed 42, 43. Following this the algebraic sign (±1) of the sum is extracted and appropriately assigned to the I or Q chip.

The weighting factors are determined by the commanded power distribution 41. These may be pre-computed and tabulated or computed in real time. The weighting factors may be constant over the said power control interval, or they may vary within the power control interval according to a pattern designed to realize the power distribution. The weighting factors applied to the Q chips will be identical to those applied to I. Weighting factors are assigned such that neither resulting sum can be exactly equal to zero. Typically the weighting factors are positive integers.

The resulting chip sequences may be characterized mathematically. Let the I (or Q) chip for user u at chip time n be designated as $I_{u,n}$ ($Q_{u,n}$), and let the weighting factor for the same user and time be denoted as $w_{u,n}$. The output I and Q chips at time n can then be written as:

$$I_n = \text{sgn}\left[\sum_u w_{u,n} I_{u,n}\right]$$

$$Q_n = \text{sgn}\left[\sum_u w_{u,n} Q_{u,n}\right]$$

where the function sgn(x) is defined mathematically as:

$$\text{sgn}(x) = \frac{x}{|x|}; x \neq 0.$$

The weight functions are chosen such that the quantities whose algebraic signs are taken can never equal zero. The digital sequences $\{I_n\}$ and $\{Q_n\}$ 44, 45 are converted to analog baseband signals by pulse amplitude modulation by modulators 46, 47, the modulation pulse p(t) being a constant value of 1 over the chip interval (of length T) and zero elsewhere:

$$I(t) = \sum_u I_n p(t - nT)$$

$$Q(t) = \sum_u Q_n p(t - nT)$$

Figure 7:
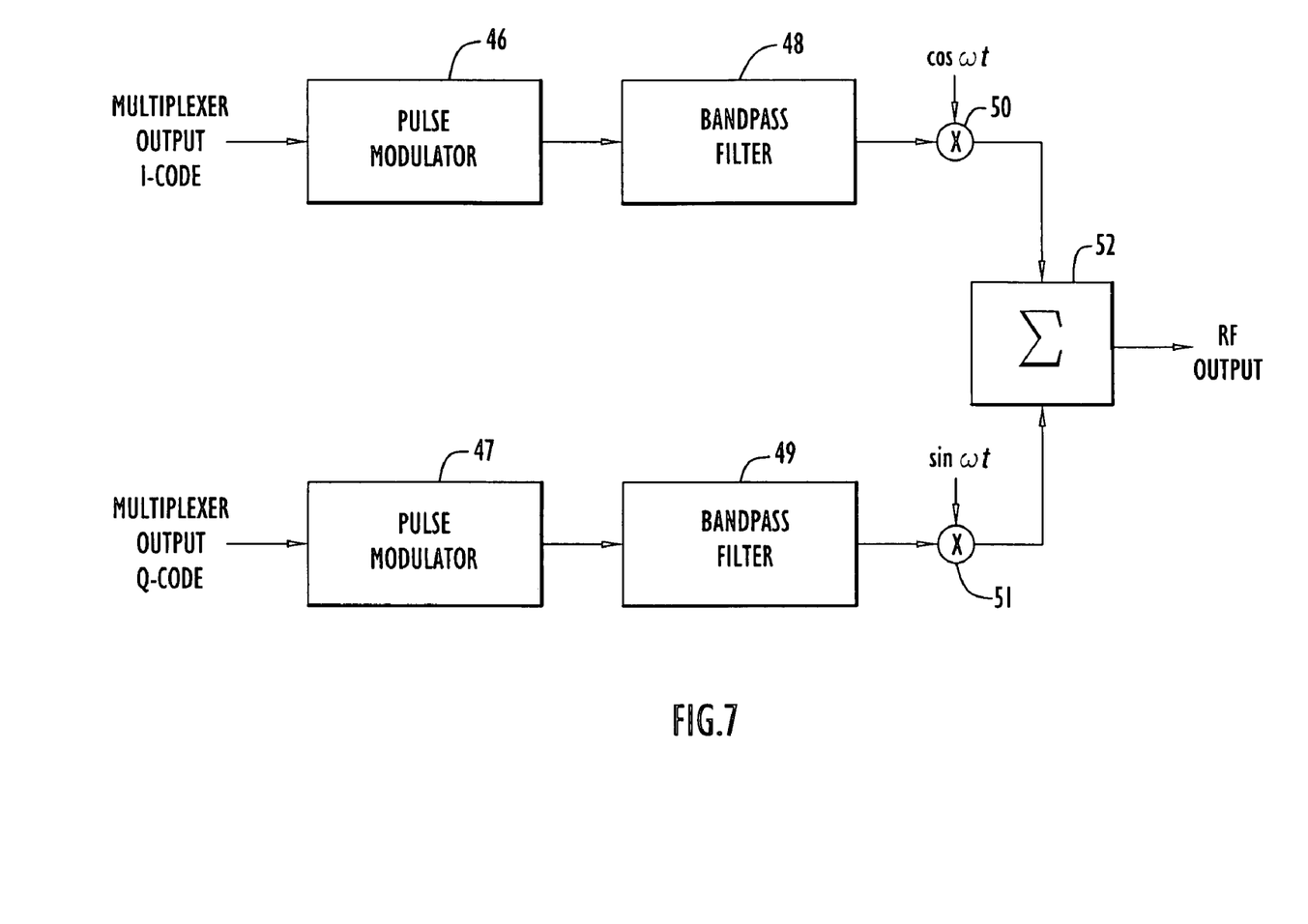
FIG. 7 illustrates the frequency conversion from baseband to radio frequency.

This resulting I and Q baseband signals may be subsequently baseband filtered 48, 49 to meet applicable spectral containment desires or regulations and upconverted 50 51 and combined 52 to provide the RF output.

Summarizing, the invention provides a multiplexer and method for chip-synchronous code-division multiple access (CDMA) signals that produces a constant envelope signal rather than the fluctuating amplitude signal that results from linear superposition of individual CDMA waveforms. Even though the multiplexer is non-linear and incurs a multiplexing loss, its output signal permits use of a saturating (Class C) high power amplifier (HPA), as opposed to a linear, Class A amplifier run at several dB backoff, resulting in a net increase in effective transmitter power usage. The recouped transmit power can be used to improve quality of service (QoS), increase coverage, or increase traffic capacity without requiring any modification to the user equipment. Next generation user sets, however, are in position to reap further benefits from the new multiplexed signal format. Using knowledge of multiple spread spectrum codes in the multiplex, they can employ signal processing that further improves their performance and/or decreases their received power requirements.

This multiplexer applies to a variety of CDMA spread spectrum modulation formats, including BPSK (Binary Phase-Shift Keying), QPSK (Quadrature Phase-Shift Keying) and modulations that utilize arbitrary RF carrier phases. As such it can be used in many applications. Examples given herein refer to the IS-95 forward link interface, but the multiplexing technique has a wide range of CDMA and CDMA/FDMA (frequency-division multiple access) applications, including general cellular base station forward traffic channels, cellular subscriber station multiple-channel reverse traffic channels (e.g. IS-95 subscriber Internet access) and satellite downlinks.

While the invention has been described in relation to preferred embodiments of the invention, it will be appreciated that other embodiments, adaptations and modifications of the invention will be apparent to those skilled in the art.

What is claimed is:

1. In a spread spectrum, chip synchronous CDMA communication system, a method of improving quality of services (QoS), increasing range of coverage and increasing traffic capacity wherein the spread spectrum, chip-synchronous CDMA communication system includes a multiplicity of user channels, each user channel including digital quadrature (I, Q) channels and a common multiplexer for the I, Q channels, the method comprising:
    receiving from an external source, a set of chip-synchronous CDMA signals to be transmitted;
    separately multiplexing the I channels and the Q channels into two separate constant-envelope baseband signals;
    selecting, on a chip-by-chip basis, the polarity of the I and Q chips including the multiplexer output baseband signal;
    baseband filtering both constant-envelope baseband signals to produce baseband-filtered signals;
    upconverting both baseband filtered signals to radio frequency (RF);
    combining both upconverted signals in quadrature at RF; and
    broadcasting the upconverted baseband filtered signals at RF.

2. The method of claim 1, further comprising:
    receiving from an external source a commanded RF power distribution among the chip-synchronous CDMA signals to be transmitted.

3. The method of claim 1, further comprising:
    selecting the instantaneous multiplex algorithm to achieve a commanded RF power distribution among the signals to be transmitted.

4. The method of claim 1, further comprising:
    generating two digital baseband signals consisting of the sequences of I and Q chips generated by the multiplexer.

5. In a spread spectrum, chip-synchronous CDMA communication system, an apparatus for improving quality of service (QoS), increasing range of coverage and increasing traffic capacity wherein the spread spectrum, chip-synchronous CDMA communication system includes a multiplicity of user channels, each user channel including digital quadrature (I, Q) channels and a common multiplexer for the I, Q channels, the apparatus comprising:
   a receiver for receiving from an external source a set of chip-synchronous CDMA signals to be transmitted;
   a polarity selector for selecting on a chip-by-chip basis, the polarity of the I and Q chips including the multiplexer output baseband signal;
   a multiplexer for separately multiplexing the I channels and the Q channels into two separate constant-envelope baseband signals;
   baseband filter for baseband filtering both the constant-envelope baseband signals to produce baseband-filtered signals;
   an upconverted for upconverting both baseband filtered signals to radio frequency (RF); and
   a combiner for combining both upconverted signals in quadrature at RF and broadcasting the upconverted baseband filtered signals at RF.

6. The apparatus of claim 5, further comprising:
   a receiver for receiving from an external source a commanded RF power distribution among the chip-synchronous CDMA signals to be transmitted.

7. The apparatus of claim 5, further comprising:
   a selector for selecting the instantaneous multiplexer algorithm to achieve commanded RF power distribution among the signals to be transmitted.

8. The apparatus of claim 5, further comprising:
   a generator for generating two digital baseband signals consisting of the sequences of I and Q chips generated by the multiplexer.

9. In a CDMA communication system having a multiplicity of user data channels each user data channel including quadrature (I, Q) channels and a common multiplexer for the I, Q channels, the system for enhancing quality of service (QoS) and increasing traffic capacity comprising:
   a set of chip-synchronous CDMA signals to be transmitted, the signals being received from an external source;
   a polarity selector for selecting, on a chip-by-chip basis the polarity of the I and Q chips including the multiplexer output baseband signal:
   a baseband filter for baseband filtering the I, Q channels after constant envelope multiplexing by the multiplexer; and
   an upconverter for upconverting the baseband filtered signals and broadcasting the upconverted baseband filtered signals at RF.

10. In a CDMA communication system, the method of improving quality of service (QoS) and increasing traffic capacity wherein the CDMA communication system includes a multiplicity of user data channels, each data channel including quadrature (I, Q) channels and a common multiplexer for the I, Q channels, the method comprising:
    receiving from an external source, a set of chip-synchronous CDMA signals to be transmitted;
    selecting, on a chip-by-chip basis, the polarity of the I and Q chips including the multiplexer output baseband signal;
    baseband filtering the I, Q channels after constant envelope multiplexing by the multiplexer to produce baseband filtered signals; and
    upconverting the baseband filtered signals and broadcasting the upconverted baseband filtered signals at RF.

11. A method of multiplexing a plurality of input signals to form a single constant-envelope output signal, the input signals being chip-synchronous, the method comprising:
    receiving a plurality of chip-synchronous Code Division Multiple Access (CDMA) signals to be transmitted;
    (a) evaluating on a chip-by-chip basis a logic value of the input signals; and
    (b) generating a single constant-envelope output signal, a value of the single output signal being based on a function of the logic values of the input signals,
    wherein a multiplexing loss resulting from multiplexing the plurality of input signals is substantially the same for each of the plurality of input signals.

12. The method of claim 11, wherein (a) includes converting a logic value of the input signal on a chip to a numeric value.

13. The method of claim 11, wherein (b) includes
    applying multiplicative weighting factors to the numeric values of each chip;
    summing the weighted numeric values;
    extracting the algebraic sign of the sum of the weighted numeric values.

14. The method of claim 13, wherein the weighting factors are determined by the commanded power distribution.

15. The method of claim 14, wherein the weighting factors are pre-computed and tabulated.

16. The method of claim 14, wherein the weighting factors are computed in real time.

17. The method of claim 13, wherein the weighting factors are constant over a power control interval.

18. The method of claim 13, wherein the weighting factors vary within the power control interval according to a predetermined pattern.

19. The method of claim 18, wherein the predetermined pattern realizes a power distribution.

20. The method of claim 11, wherein the input signals being classified in one of a first group and a second group based on a power allocation associated with the plurality of signals; and
    the method further comprising:
    determining weighting factors of input signals in the first group; and
    determining weighting factors of input signals in the second group in a manner different from the first group.

21. The method of claim 20, wherein the weighting factors of the signals in the first and the second groups are equal.

22. The method of claim 11, wherein the multiplexing comprises majority-vote logic processing.

23. An apparatus for multiplexing a plurality of input signals to form a single constant-envelope output signal, the input signals being chip-synchronous, the apparatus comprising:
    a logic unit receiving the plurality of input signals; and
    a signal generator generating a single constant-envelope output composite signal based on a function of the plurality of input signals,
    wherein the plurality of input signals are Code Division Multiple Access (CDMA) data streams and a multiplexing loss resulting from multiplexing the plurality of input signals is substantially the same for each of the plurality of input signals.

24. The apparatus of claim 23, wherein the logic unit weights values of the plurality of input signals to form weighted signal values, sums the weighted signal values to form a weighted sum, and sets a value of the single constant-envelope output signal in accordance with an arithmetic sign of the weighted sum.

25. The apparatus of claim 23, wherein the logic unit weights the values of the plurality of input signals in accordance with a power allocation associated with the plurality of input signals.

26. The apparatus of claim 24, wherein the logic unit determines weighting factors used to weight the values of the plurality of input signals each time the power allocation changes.

27. The apparatus of claim 23, wherein the logic unit classifies each of the plurality of input signals into one of a first group and a second group based on a power allocation associated with the plurality of input signals, determines weighting factors of signals in the first group; and determines weighting coefficients of signals in the second group in a manner different from the first group.

28. The apparatus of claim 27, wherein the weighting factors of the first and second groups are equal.

29. The method of claim 23, wherein the multiplexing comprises majority-vote logic processing.

30. An apparatus for multiplexing a plurality of input signals to form a single constant-envelope output signal, comprising:
  means for generating the plurality of input signals; and
  means for generating a single constant-envelope output signal based on a weighted sum of the logic values of a plurality of input signals,
  wherein the plurality of input signals are Code Division Multiple Access (CDMA) data streams.

31. The apparatus of claim 30, wherein the means for generating a single constant-envelope output signal includes
  means for weighting values of the plurality of input signals to form weighted signal values;
  means for summing the weighted signal values to form a weighted sum; and
  means for setting a value of the single constant-envelope output signal in accordance with an arithmetic sign of the weighted sum.

32. The apparatus of claim 31, wherein the means for weighting weights the values of the plurality of input signals in accordance with a power allocation associated with the plurality of signals.

33. The apparatus of claim 32, wherein the means for weighting determines weighting factors used to weight the values of the plurality of signals each time the power allocation changes.

34. The apparatus of claim 30, wherein the means for generating classifies each of the plurality of input signals into one of a first group and a second group based on a power allocation associated with the plurality of input signals, determines weighting factors of signals in the first group; and determines weighting factors of signals in the second group in a manner different from the first group.

35. The apparatus of claim 34, wherein the weighting factors of the first and second groups are equal.

36. The apparatus of claim 30, wherein a multiplexing loss resulting from multiplexing the plurality of input signals is substantially the same for each of the plurality of input signals.

37. The method of claim 30, wherein the multiplexing comprises majority-vote logic processing.

* * * * *